(12) United States Patent
Chang

(10) Patent No.: US 10,133,309 B2
(45) Date of Patent: Nov. 20, 2018

(54) METHOD OF MANUFACTURING CASE FRAME AND ELECTRONIC DEVICE HAVING IT

(71) Applicant: Samsung Electronics Co., Ltd., Gyeonggi-do (KR)

(72) Inventor: Min-Su Chang, Incheon (KR)

(73) Assignee: Samsung Electonics Co., Ltd (KR)

( * ) Notice: Subject to any disclaimer, the term of this patent is extended or adjusted under 35 U.S.C. 154(b) by 683 days.

(21) Appl. No.: 14/290,194

(22) Filed: May 29, 2014

(65) Prior Publication Data
US 2014/0355208 A1 Dec. 4, 2014

(30) Foreign Application Priority Data

May 31, 2013 (KR) .................. 10-2013-0062450

(51) Int. Cl.
| | |
|---|---|
| *B32B 37/14* | (2006.01) |
| *G06F 1/16* | (2006.01) |
| *B29C 45/14* | (2006.01) |
| *B65D 25/14* | (2006.01) |
| *B29L 31/34* | (2006.01) |

(Continued)

(52) U.S. Cl.
CPC ...... *G06F 1/1633* (2013.01); *B29C 45/14827* (2013.01); *B32B 37/14* (2013.01); *B65D 25/14* (2013.01); *B29L 2031/3437* (2013.01); *B32B 37/12* (2013.01); *B32B 38/10* (2013.01); *B32B 2037/243* (2013.01); *Y10T 156/1002* (2015.01); *Y10T 428/24851* (2015.01)

(58) Field of Classification Search
CPC .... B29C 45/14827; B32B 37/14; B65D 25/14
See application file for complete search history.

(56) References Cited

U.S. PATENT DOCUMENTS

| | | | | |
|---|---|---|---|---|
| 5,773,126 A | * | 6/1998 | Noritake | .................. B05D 1/42 428/143 |
| 5,795,527 A | * | 8/1998 | Nakamura | .......... B29C 37/0025 264/267 |

(Continued)

FOREIGN PATENT DOCUMENTS

| | | |
|---|---|---|
| DE | 10 2007 030 307 | 1/2009 |
| EP | 0 456 822 | 12/1989 |

(Continued)

OTHER PUBLICATIONS

Machine Translation of KR 20110072782 A; Jun. 2011.*
European Search Report dated Sep. 28, 2015 issued in counterpart application No. 14168233.6-1706, 12 pages.
European Search Report dated Apr. 28, 2016 issued in counterpart application No. 14168233.6-1706, 4 pages.

*Primary Examiner* — Daniel McNally
(74) *Attorney, Agent, or Firm* — The Farrell Law Firm, P.C.

(57) ABSTRACT

A method of manufacturing a case frame is provided. The method includes forming a mold for forming an ultraviolet molding pattern layer, laminating a hard coating layer on a transfer resin film, laminating an ultraviolet molding pattern layer on the hard coating layer, laminating a deposition layer on the ultraviolet molding pattern layer, laminating a printing layer on the deposition layer, and performing transfer IMD on an injection product using a transfer resin film, on which the printing layer, the deposition layer, the ultraviolet molding pattern layer, and the hard coating layer are successively laminated.

12 Claims, 6 Drawing Sheets

(51) Int. Cl.
  *B32B 38/10*    (2006.01)
  *B32B 37/12*    (2006.01)
  *B32B 37/24*    (2006.01)

(56) References Cited

U.S. PATENT DOCUMENTS

| | | | |
|---|---|---|---|
| 6,652,983 B1* | 11/2003 | Mori | B32B 27/36 |
| | | | 428/480 |
| 7,070,849 B2 | 7/2006 | Mori et al. | |
| 2004/0005436 A1* | 1/2004 | Mori | B29C 45/14811 |
| | | | 428/141 |
| 2004/0125335 A1* | 7/2004 | Vu | B29C 37/0032 |
| | | | 351/159.62 |
| 2012/0001364 A1 | 1/2012 | Shin et al. | |

FOREIGN PATENT DOCUMENTS

| | | |
|---|---|---|
| EP | 1 291 164 | 3/2003 |
| JP | 7-329112 | 12/1995 |
| JP | 2006-044195 | 2/2006 |
| KR | 100823834 | 4/2008 |
| KR | 1020100053002 | 5/2010 |
| KR | 20110072782 A * | 6/2011 |
| KR | 1020110072782 | 6/2011 |
| KR | 1020140000549 | 1/2014 |
| WO | WO 2012/176742 | 12/2012 |
| WO | WO 2014/068925 | 5/2014 |

* cited by examiner

METHOD OF MANUFACTURING CASE FRAME AND ELECTRONIC DEVICE HAVING IT

PRIORITY

This application claims priority under 35 U.S.C. § 119(a) to a Korean Patent Application filed in the Korean Intellectual Property Office on May 31, 2013 and assigned Serial No. 10-2013-0062450, the entire disclosure of which is incorporated herein by reference.

BACKGROUND OF THE INVENTION

1. Field of the Invention

The present invention relates generally to a method of manufacturing a case frame that is used for various devices.

2. Description of the Related Art

Recently, manufacturers of electronic devices have paid attention to the external appearance as well as functions and slimness of the electronic devices. Although the electronic devices of one manufacturer may have the same function as electronic devices of other manufacturers, users tend to prefer electronic devices having a more beautiful design.

Particularly, a case frame of the electronic device defines the appearance of the electronic device, and must be excellent in terms of design, touch and texture.

A conventional method of forming the above-described case frame includes injecting the plastic materials used to form the case frame to a mold. A plurality of painting processes and a pattern printing process are then performed on the case frame that has been formed through the injection process. Finally, the case frame resulting from the processes described above is completed through a coating process. However, because the quality of the case frame such as the texture is affected by multiple processes, such as a painting process, it is impossible to implement a fine pattern.

SUMMARY OF THE INVENTION

The present invention has been made to address at least the above-mentioned problems and/or disadvantages and to provide at least the advantages described below.

Accordingly, an aspect of the present invention is to provide a method of manufacturing a case frame.

Another aspect of the present invention is to provide a method of manufacturing a case frame to increase process efficiency.

Another aspect of the present invention is to provide a method of manufacturing a case frame to improve stereoscopic texture of the case frame.

Another aspect of the present invention is to provide a method of manufacturing a case frame to reduce the entire thickness of the case frame.

In accordance with an aspect of the present invention, a method of manufacturing a case frame is provided. The method includes forming a mold for forming an ultraviolet molding pattern layer, laminating a hard coating layer on a transfer resin film using a pattern of the formed mold, laminating an ultraviolet molding pattern layer on the hard coating layer, laminating a deposition layer on the ultraviolet molding pattern layer, laminating a printing layer on the deposition layer, and performing transfer IMD on an injection product using a transfer resin film, on which the printing layer, the deposition layer, the ultraviolet molding pattern layer, and the hard coating layer are successively laminated.

In accordance with another aspect of the present invention, a case frame is provided. The case frame is formed by forming a mold for forming an ultraviolet molding pattern layer, laminating a hard coating layer on a transfer resin film using a pattern of the formed mold, laminating an ultraviolet molding pattern layer on the hard coating layer, laminating a deposition layer on the ultraviolet molding pattern layer, laminating a printing layer on the deposition layer, and performing transfer IMD on an injection product using a transfer resin film, on which the printing layer, the deposition layer, the ultraviolet molding pattern layer, and the hard coating layer are successively laminated.

In accordance with another aspect of the present invention, a transfer in-mold film is provided. The transfer in-mold film includes a hard coating layer which is finally disposed on a most external surface of an injection product after transfer IMD, an ultraviolet molding pattern layer which is formed by laminating a pattern formed by an ultraviolet pattern mold on a rear surface of the hard coating layer, a deposition layer which is used as a background of the ultraviolet molding pattern layer and formed on the ultraviolet molding pattern layer, a printing layer used to implement a color of the case frame on a rear surface of the deposition layer, and an adhesive layer which is laminated on the printing layer to easily adhere to the injection product in the transfer IMD.

In accordance with another aspect of the present invention, a transfer in-mold film is provided. The transfer in-mold film includes a transfer resin film to be eventually peeled off in transfer IMD, a mold release layer formed on the transfer resin film, a hard coating layer which is laminated on the mold release layer and is finally disposed on a most external surface of an injection product after the transfer IMD, an ultraviolet molding pattern layer formed by laminating a pattern formed by an ultraviolet pattern mold on the hard coating layer, a deposition layer used as a background of the ultraviolet molding pattern layer on the ultraviolet molding pattern layer, a primary layer which is laminated on the deposition layer for smooth printing, a printing layer used to implement a color of a case frame on the deposition layer, and an adhesive layer which is laminated on the printing layer to easily adhere to the injection product in the transfer IMD.

BRIEF DESCRIPTION OF THE DRAWINGS

The above and other aspects, features and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Various embodiments of the present invention will be described herein below with reference to the accompanying drawings. In the following description, well-known functions or constructions are not described in detail for clarity and conciseness.

In the following explanation of certain embodiments of the present invention, a description will be given for a method of manufacturing a case frame applied to, but not limited to, an electronic device. However, it is obvious that the case frame may be applied to a housing formed as the appearance of various devices besides the electronic device.

Figure 1A:
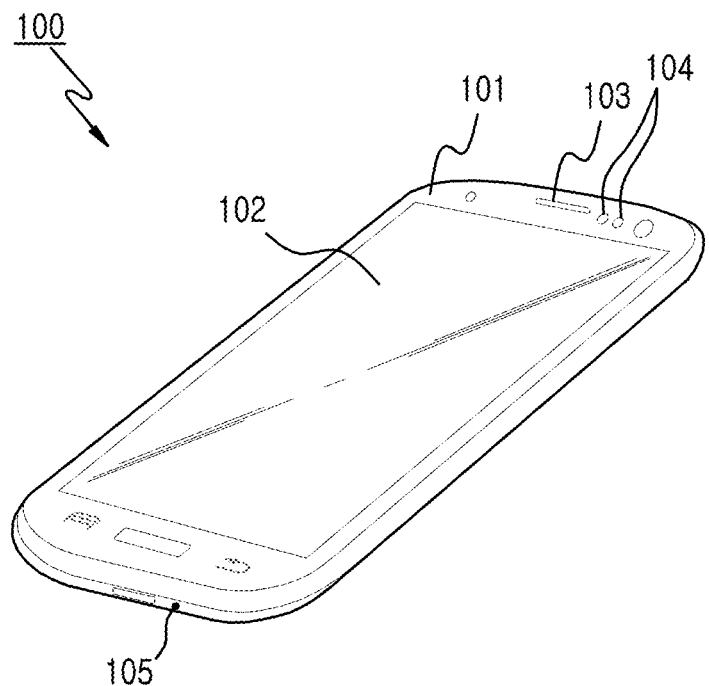
FIGS. 1A and 1B are perspective views of an electronic device with a case frame formed by a manufacturing method according to an embodiment of the present invention.
Figure 1B:
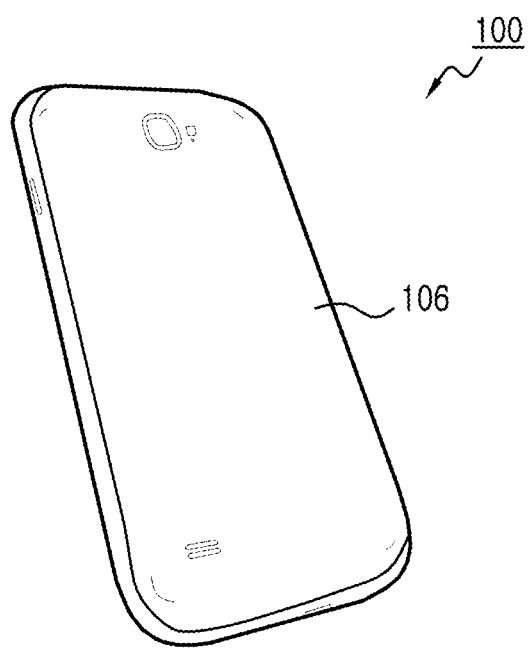

FIGS. 1A and 1B are perspective views of an electronic device with a case frame formed by a manufacturing method according to an embodiment of the present invention.

Referring to FIGS. 1A and 1B, an electronic device 100 is a portable terminal for communication. A case frame 101 of the electronic device 100, as a housing of the electronic device 100, may form the appearance of the electronic device 100. A display device 102 is installed on a front surface of the electronic device 100. An ear-piece 103 for telephone call and a plurality of sensors 104 may be installed in an upper region of the electronic device 100 that is above the display device 102. A microphone 105 for telephone call may be installed in a lower region of the electronic device 100 that is below the display device 102.

A battery cover 106 is installed on a rear surface of the electronic device 100 to form the appearance of the rear surface of the electronic device 100. In principle, as illustrated in FIG. 2B, the battery cover 106 forms the entire rear surface of the electronic device 100, but is not limited thereto. For example, the battery cover 106 may form a partial appearance of the rear surface of the electronic device 100, and the remaining portion of the rear surface of the electronic device 100 may be formed of the above-described case frame.

In accordance with an embodiment of the present invention, it is possible to form a stereoscopic pattern by adding a hard coating layer laminated on a transfer resin film which is peeled off in transfer Insert Mold Decoration (IMD) and adding an ultraviolet molding pattern layer and a deposition layer laminated on the hard coating layer. In accordance with another embodiment of the present invention, it is possible to implement a finer pattern, compared with a pattern formed using a conventional method, by forming an ultraviolet molding pattern layer using an ultraviolet curable resin. In accordance with another embodiment of the present invention, it is possible to form shapes of various stereoscopic patterns by forming an additional pattern on a hard coating layer by a mold on which a certain pattern is formed. In accordance with another embodiment of the present invention, a pattern formed on a hard coating layer may be formed on a single surface or double surfaces.

Figure 2:
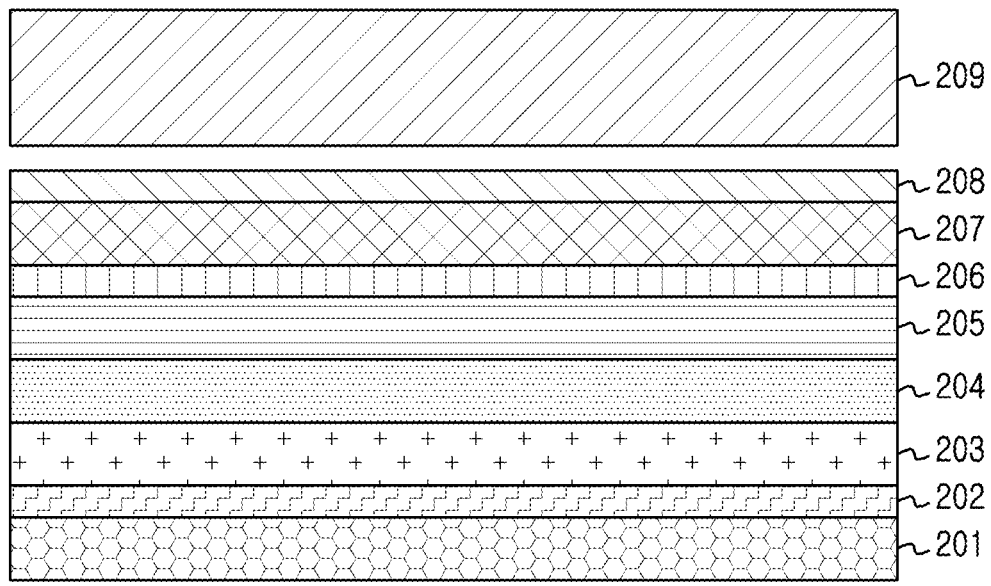
FIG. 2 is a cross sectional view of a principal part of a case frame manufactured according to an embodiment of the present invention.
Figure 3:
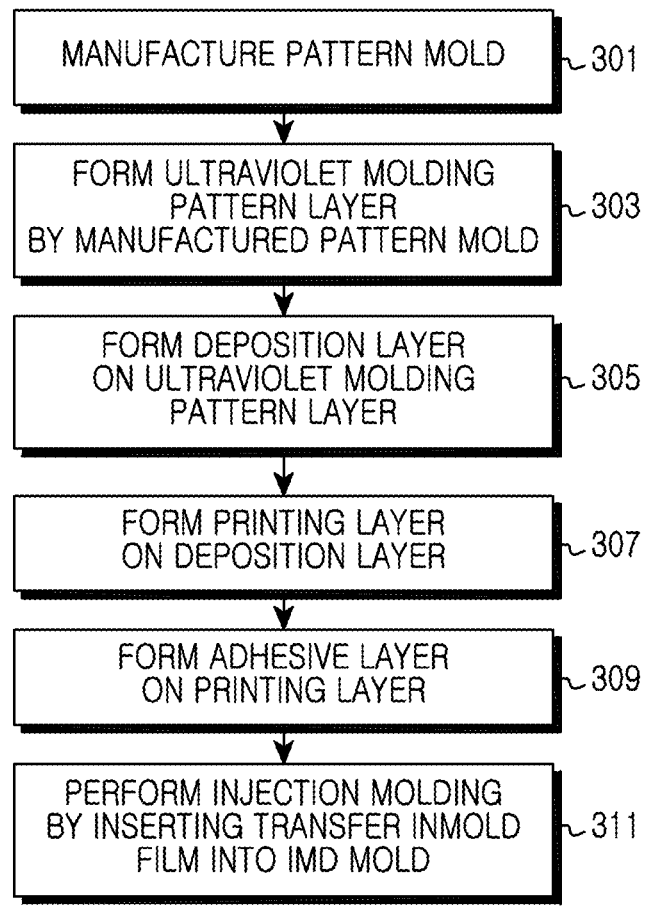
FIG. 3 is a flowchart illustrating a process of manufacturing a case frame according to an embodiment of the present invention.
Figure 4A:
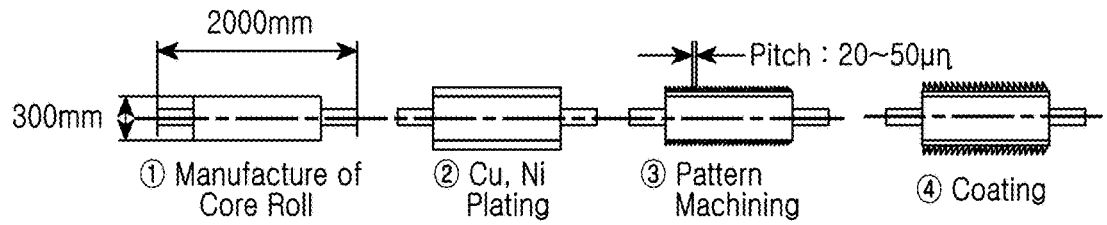
FIGS. 4A to 4C illustrate a process of producing a transfer resin film with an ultraviolet molding pattern layer and a deposition layer according to an embodiment of the present invention.
Figure 4B:
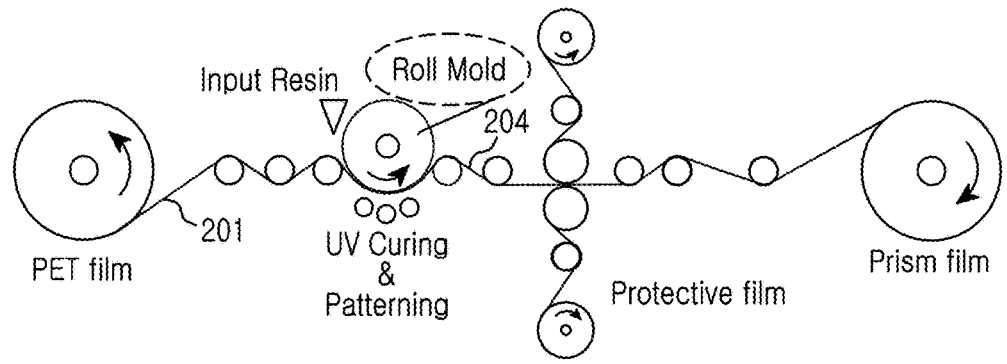
Figure 4C:
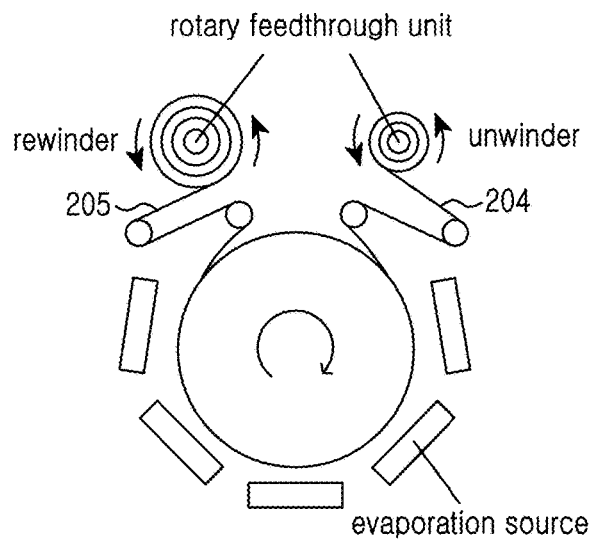

FIG. 2 is a cross section view of a principal part of a case frame manufactured according to an embodiment of the present invention. FIG. 3 is a flowchart illustrating a process of manufacturing a case frame according to an embodiment of the present invention. FIGS. 4A to 4C illustrate a process of producing a transfer resin film including an ultraviolet molding pattern layer and a deposition layer according to an embodiment of the present invention.

Referring to FIGS. 2 and 3, the case frame may include a hard coating layer 203 which is exposed as its most external layer, an ultraviolet molding pattern layer 204 which is laminated on the hard coating layer 203, a deposition layer 205 which is laminated on the ultraviolet molding pattern layer 204, and a primary layer 206, a printing layer 207, and an adhesive layer 208 which are successively laminated on the deposition layer 205. The adhesive layer 208 may adhere to an external surface of an injection product 209. The injection product includes base material of the case frame prior to manufacturing case frame.

The hard coating layer 203 may be laminated on a transfer resin film 201 to be used in transfer IMD. A mold release layer 202 may be interposed between the transfer resin film 201 and the hard coating layer 203 to smoothly peel off the transfer resin film 201 from the hard coating layer 203 in transfer IMD.

The transfer resin film 201 may be made of transparent plastic materials such as PolyEthylene Terephthalate (PET) or PolyCarbonate (PC). In accordance with a previously manufactured target design, the transfer resin film 201 may be made of colorless transparent materials and may be also made of semitransparent materials with a certain color. Because the transfer resin film 201 is eventually peeled off in transfer IMD, it is not necessary to use an expensive film. For example, the transfer resin film 201 may be an inexpensive universal resin film having a surface that is not reformed using a corona or plasma process.

The hard coating layer 203, as the most external layer of the case frame, may be made of, but is not limited to, materials which may be cured by ultraviolet rays. The hard coating layer 203 may also be made of various materials which may improve scratch resistance. The hard coating layer 203 may be also formed of materials such as PET or PC film. The hard coating layer 203 may protect the ultraviolet molding pattern layer 204 as described below.

The hard coating layer 203 is applied to a separate mold (a mold of a roll or panel type) to form a separate pattern on double surfaces or a single surface of the hard coating layer 203. This pattern may be formed on a surface facing the ultraviolet molding pattern layer 204 or a surface on the other side. The hard coating layer 203 may be formed with a thickness in a range of about 3 μm to 5 μm.

The ultraviolet molding pattern layer 204 may include a plurality of patterns. The plurality of patterns may have the same shape and width. The ultraviolet molding pattern layer 204 may also have different heights and widths. The ultraviolet molding pattern layer 204 may be formed of materials which may be cured by ultraviolet rays, such as a photopolymerizable resin. The ultraviolet molding pattern layer 204 may be formed with a thickness in a range of about 8 μm to 12 μm. The ultraviolet molding pattern layer 204 may be molded using a certain ultraviolet pattern mold (a mold of a roll or panel type). Herein, a pattern of the ultraviolet pattern mold may be manufactured using a photolithography method, a laser processing method, a physical scratch method, etc. When using the photolithography method, it is easy to form patterns with a plurality of same or different widths and depths and a relatively small width.

The deposition layer 205 may be deposited and laminated on the ultraviolet molding pattern layer 204. After a transfer in-mold film, which includes the hard coating layer 203, the ultraviolet molding pattern layer 204, the deposition layer 205, the primary layer 206, the printing layer 207, and the adhesive layer 208, is transferred to the injection product 209, the deposition layer 205 may be expressed as a background of the ultraviolet molding pattern layer 204, such as a background color. The deposition layer 205 may be also formed as a metal plating layer which may have a mirror effect. Also, the deposition layer 205 may be implemented as plating layers of various colors. It is preferable that the deposition layer 205 is formed with a thickness about 1 μm or less.

The printing layer 207 may have various colors which are finally applied to the case frame. The printing layer 207 may be formed through silk screen printing or gravure printing. The primary layer 206 may be further interposed between the printing layer 207 and the deposition layer 205 so that the printing layer 207 is uniformly coated on the deposition layer 205. The primary layer 206 may be formed using at least one or more of an olefin series, an acrylic series, and a urethane series.

The adhesive layer 208 is used for adhesion between the injection product 209 and the printing layer 207. The total thickness of the adhesive layer 208, the printing layer 207, and the primary layer 206 may be in a range of about 15 μm to 25 μm.

The transfer in-mold film, including the hard coating layer 203, the ultraviolet molding pattern layer 204, the deposition layer 205, the primary layer 206, the printing layer 207, and the adhesive layer 208, may be formed with a thickness in a range of about 35 μm to 40 μm.

Referring to FIGS. 2 and 3, a description will be given for a process of manufacturing the transfer in-mold film.

In step 301, a roll type pattern mold is manufactured, as illustrated in ① of FIG. 4A. An Outer surface of the roll type pattern mold may be plated with Cu and/or Ni, as illustrated in ② of FIG. 4A. The pattern mold may be used to form, as illustrated in ③ of FIG. 4A, a pattern on the outer surface of a core roll using Cu and/or Ni. Here, a pattern formed on the outer surface of a roll-type mold may be also formed by the photolithography method. The pattern of the Pattern mold may be coated, as illustrated in ④ of FIG. 4A.

In step 303, the ultraviolet molding pattern layer 204 may be formed using the manufactured pattern mold. The ultraviolet molding pattern layer 204 may be formed, as illustrated in FIG. 4B, while a film is wound from one roll to another roll which are spaced apart from each other at a certain interval. The ultraviolet molding pattern layer 204 may be formed by coating a photopolymerizable resin on the transfer resin film 201 while the transfer resin film 201 is wound, and irradiating and curing the photopolymerizable resin by ultraviolet rays on the transfer resin film 201 while the transfer resin film 201 passes through a roll-type mold on which a pattern is formed. The hard coating layer 203 may be further formed and interposed between the transfer resin film 201 and the ultraviolet molding pattern layer 204. A certain pattern may be further formed on double surfaces or a single surface of the hard coating layer 203 using a separate mold.

In step 305, the deposition layer 205 is formed on the ultraviolet molding pattern layer 204. As illustrated in FIG. 4C, the deposition layer 205 may be formed on the transfer resin film 201 on which the ultraviolet molding pattern layer 204 has been formed, using certain evaporation sources.

In step 307, the printing layer 207 is formed on the deposition layer 205. Prior to step 307, the primary layer 206, which is made of materials of at least one or more of an olefin series, a urethane series, and an acrylic series, may be first coated on the deposition layer 205 such that the printing layer 207 is effectively printed on the deposition layer 205. The printing layer 207 may be formed by a silk screen printing method or a gravure printing method.

In step 309, the adhesive layer 208 is formed on the printing layer 207. In step 311, injection molding may be performed by applying the transfer in-mold film, including the hard coating layer 203, the ultraviolet molding pattern layer 204, the deposition layer 205, the primary layer 206, the printing layer 207, and the adhesive layer 208, to an IMD mold.

After a high temperature is applied during the transfer IMD, the transfer resin film 201 may be easily peeled off from the hard coating layer 203 due to the interposed mold release layer 202.

Figure 5A:
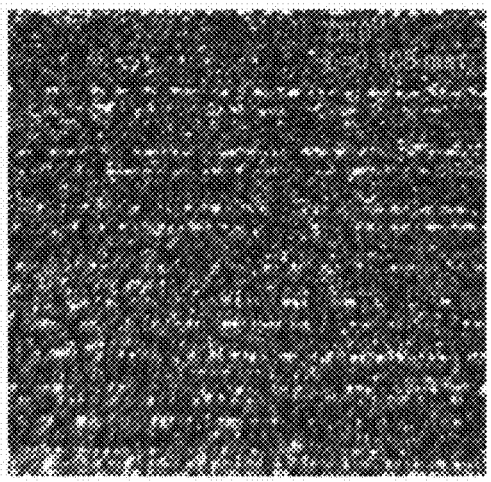
FIGS. 5A and 5B illustrate a pattern of a case frame manufactured according to an embodiment of the present invention compared with that of a conventional case frame.
Figure 5B:
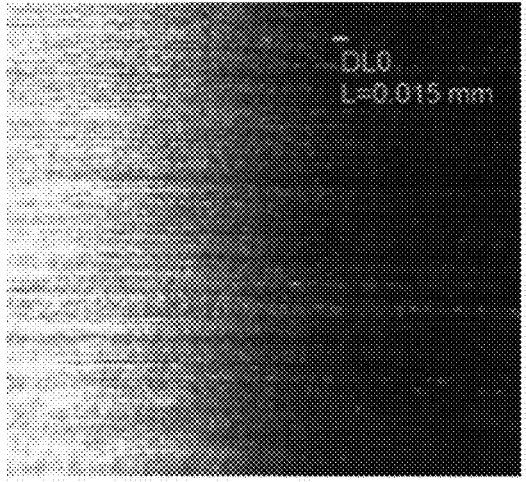

FIGS. 5A and 5B illustrate a pattern of a case frame manufactured according to an embodiment of the present invention compared with that of a conventional case frame.

FIG. 5A illustrates an external surface of a case frame having a pattern formed by a conventional method. FIG. 5B illustrates an external surface of a case frame formed by a method using an ultraviolet molding pattern layer according to an embodiment of the present invention.

Referring to FIG. 5A, the pattern formed by a conventional method may have a width of 0.108 mm. Referring to FIG. 5B, the pattern formed according to an embodiment of the present invention may be have a width of 0.015 mm.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. A method of manufacturing a case frame, the method comprising:
    forming a mold for forming an ultraviolet molding pattern layer;
    laminating a hard coating layer on a transfer resin film, wherein the hard coating layer has an auxiliary pattern which is formed by a separate mold and is cured by ultraviolet rays, and wherein the separate mold is distinct from the mold;
    laminating the ultraviolet molding pattern layer on the hard coating layer;
    laminating a deposition layer on the ultraviolet molding pattern layer;
    laminating a printing layer on the deposition layer; and
    performing a transfer of insert mold decoration (IMD) on an injection product using the transfer resin film, on which the printing layer, the deposition layer, the ultraviolet molding pattern layer, and the hard coating layer are successively laminated,
    wherein the hard coating layer is finally disposed on a most external surface of an injection product after the transfer IMD and is configured to protect the ultraviolet molding pattern layer,
    wherein the ultraviolet molding pattern layer is formed with a thickness in a range of 8 μm to 12 μm, and
    wherein the deposition layer is formed with a thickness of 1 μm or less.

2. The method of claim 1, further comprising laminating a primary layer between the printing layer and the deposition layer for printing the printing layer.

3. The method of claim 2, wherein the primary layer is formed of one or more of an olefin series, an acrylic series, and a urethane series.

4. The method of claim 1, wherein the transfer resin film comprises:
    the ultraviolet molding pattern layer which is formed by laminating a pattern formed by an ultraviolet pattern mold on the hard coating layer;

the deposition layer used as a background of the ultraviolet molding pattern layer and formed on the ultraviolet molding pattern layer;

the printing layer used to implement a color of the case frame and formed on a rear surface of the deposition layer; and an adhesive layer which is laminated on the printing layer to easily adhere to the injection product in the transfer IMD.

5. The method of claim 4, wherein the auxiliary pattern is formed on at least one of a first surface facing the ultraviolet molding pattern layer of the hard coating layer and a second surface which is opposite to the first surface of the hard coating layer.

6. The method of claim 1, wherein the mold for forming the ultraviolet molding pattern layer has a roll type or a panel type.

7. The method of claim 1, further comprising laminating a mold release layer between the transfer resin film and the hard coating layer for smoothly peeling off the transfer resin film from the hard coating layer.

8. The method of claim 1, wherein the auxiliary pattern is formed on at least one of a first surface facing the ultraviolet molding pattern layer of the hard coating layer and a second surface which is opposite to the first surface of the hard coating layer.

9. The method of claim 1, wherein the hard coating layer is formed of a film type of Polyethylene Terephthalate (PET) or Polycarbonate (PC), or a cured photopolymerizable resin.

10. The method of claim 1, further comprising laminating an adhesive layer between the injection product and the printing layer for adhering the injection product with the printing layer.

11. The method of claim 1, wherein the hard coating layer is formed with a thickness in a range of 3 μm to 5 μm.

12. The method of claim 1, wherein the transfer resin film comprises:

the ultraviolet molding pattern layer formed by laminating a pattern formed by an ultraviolet pattern mold on the hard coating layer;

the deposition layer used as a background of the ultraviolet molding pattern layer on the ultraviolet molding pattern layer;

a primary layer which is laminated on the deposition layer for smooth printing;

the printing layer used to implement a color of a case frame on the primary layer; and an adhesive layer which is laminated on the printing layer to easily adhere to the injection product in the transfer IMD.

* * * * *